United States Patent
Becker et al.

(10) Patent No.: US 6,371,434 B1
(45) Date of Patent: Apr. 16, 2002

(54) SPRING ARRANGEMENT APPARATUS FOR MOUNTING A VIBRATION-SENSITIVE OR SHOCK-SENSITIVE DEVICE

(75) Inventors: Volker Becker; Ingo Hermanns, both of Hildesheim; Frank Koertje, Algermissen; Thomas Westendorf, Harsum; Holger Zimmermann, Hildesheim; Wilfried Repper, Hannover, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/254,444
(22) PCT Filed: Sep. 2, 1997
(86) PCT No.: PCT/DE97/01917
  § 371 Date: Nov. 22, 1999
  § 102(e) Date: Nov. 22, 1999
(87) PCT Pub. No.: WO98/11362
  PCT Pub. Date: Mar. 19, 1998

(30) Foreign Application Priority Data

Sep. 9, 1996 (DE) .......................................... 196 36 496

(51) Int. Cl.[7] ............................ F16M 13/00; F16F 1/00
(52) U.S. Cl. ....................... 248/610; 248/638; 267/150; 267/166.1
(58) Field of Search ................................. 248/610, 613, 248/560, 581, 636, 589, 638, 623; 52/167; 362/145, 369; 267/288, 166.1, 174, 160, 150

(56) References Cited

U.S. PATENT DOCUMENTS 1,554,501 A * 9/1925 Horle et al. ................ 248/614
1,710,478 A * 4/1929 Hoppin ........................ 211/33
2,246,323 A * 6/1941 Schaelchlin ................ 248/623
2,474,042 A * 6/1949 Egle, Jr. ....................... 92/161

(List continued on next page.)

FOREIGN PATENT DOCUMENTS

| DE | 12 52 785 | 10/1967 |
| FR | 1115329 | 4/1956 |
| GB | 571026 | 6/1948 |
| GB | 1157964 | 7/1969 |
| GB | 2176870 | 1/1987 |
| JP | 63 076932 | 4/1988 |

* cited by examiner

Primary Examiner—Anita King
Assistant Examiner—Naschica S Morrison
(74) Attorney, Agent, or Firm—Kenyon & Kenyon

(57) ABSTRACT

Spring arrangement for mounting a vibration- or shock-sensitive device attached to a supporting member in a housing, with the supporting member being fastened to the housing by helical spring elements. The supporting member is suspended in the housing by helical spring elements so that each elastic force component of one spring applied to the supporting member in a specific direction is counteracted by at least one elastic force component of another spring applied in the opposite direction so that the supporting member remains approximately in the center of the vibration clearance provided regardless of the position in which the housing is mounted in a motor vehicle. Due to the opposing elastic forces of the springs, the spring constant and therefore the natural frequency of the overall system can be advantageously increased, thus avoiding undesired points of resonance at low frequencies.

8 Claims, 4 Drawing Sheets

U.S. PATENT DOCUMENTS

| | | | | |
|---|---|---|---|---|
| 2,799,778 A | * | 7/1957 | Stephenson | 331/98 |
| 2,905,162 A | * | 9/1959 | Johnson | 123/406.73 |
| 3,115,323 A | * | 12/1963 | Crandell | 248/582 |
| 3,155,855 A | * | 11/1964 | Futterer | 310/38 |
| 3,220,726 A | * | 11/1965 | Koller et al. | 472/105 |
| 3,450,379 A | * | 6/1969 | Nolan | 248/636 |
| 4,402,483 A | | 9/1983 | Kurabayashi et al. | |
| 4,482,125 A | * | 11/1984 | Ziernicki | 248/604 |
| 4,722,505 A | * | 2/1988 | Kaiser | 248/561 |
| 4,870,552 A | * | 9/1989 | Vitta et al. | 362/369 |
| 5,042,024 A | * | 8/1991 | Kurosawa et al. | 369/75.1 |
| 5,366,200 A | | 11/1994 | Scura | |
| 5,886,810 A | * | 3/1999 | Siahpoushan et al. | 359/285 |
| 6,129,445 A | * | 10/2000 | Landy | 362/369 |

SPRING ARRANGEMENT APPARATUS FOR MOUNTING A VIBRATION-SENSITIVE OR SHOCK-SENSITIVE DEVICE

BACKGROUND INFORMATION

A method for attaching a vibration- or shock-sensitive device, such as a stereo system, compact disc player, CD changer, or floppy or hard disk drive to a supporting member and mounting the supporting member with vibration damping in a housing via helical spring elements is already known. Particularly in motor vehicles, low-vibration and low-impact methods of attaching compact disc players are required in order to operate the equipment without interference. For this purpose, the device is thus elastically suspended on the equipment housing, which is permanently installed in the motor vehicle, with the supporting member being attached to the housing via multiple helical spring elements provided in the form of either extension springs or compression springs.

FIG. 1a shows a conventional spring arrangement using extension springs, and FIG. 1b shows the arrangement using compression springs. In FIG. 1a, a supporting member 2 in the form of a plate, with a compact disc player 1, for example, attached to its top, is fastened to the top of a cuboid housing 3 via a total of four helical springs (10, 11), only two of which are illustrated. According to this arrangement, an excitation acting upon housing 3 produces only an extremely diminished acceleration of CD player 1. By suspending the device in this manner, points of resonance form which are associated with an undesirable, strong vibration of device 1 at low excitation frequencies, thus causing device 1 to bump against housing 3. To avoid this disadvantage, it is desirable to increase natural frequency $w_{max}$ of the system subject to vibrations, since this will considerably diminish the acceleration of CD player 1 during excitation. With a given mass M according to equation (1), this can be achieved only by increasing spring constant K.

$$\omega_{max} = \sqrt{\frac{K}{M}} \quad (1)$$

However, the supporting plate suspended on springs 10, 11 in FIG. 1a must be displaced by the force of its own weight until it ends up more or less in the center of the vibration clearance provided for it, the height of which is marked x in FIG. 1a. This can be achieved by reducing the spring constant, which, however, should be avoided as shown by equation (1), due to the resulting undesired reduction in the natural frequency. The spring arrangements illustrated in FIG. 1a and FIG. 1b also have the disadvantage that they can be used only in situations where the springs are loaded axially, i.e., in the direction of the spring axis. However, the springs are more compliant when the force is applied radially. The springs are barely extended in that case, but rather are merely swivelled or bent. As a result, only weak restoring forces are applied in the radial direction. Radially oriented forces act upon the springs when the device is installed in the motor vehicle in a direction other than the specified mounting position. A situation of this type is illustrated in FIG. 2a. When device 3 tilts to the side, supporting member 2 is displaced far to the side by its weight, thus reducing the vibration clearance. If a vibration or impact excitation occurs, there is the danger of the device striking the side walls of the housing. The use of a spring arrangement, like the one shown in FIG. 1, is therefore limited to situations in which the compact disc player is specifically designed for a predetermined mounting position, e.g., if it can be installed in the vehicle only horizontally or only vertically. Compact disc players in car radio equipment often need to be installed in consoles at an angle. If the player housing is attached to the roof structure of a bus, for example, a certain angle of inclination is desirable in order to make the CDs easier to insert. According to the related art, supporting member 2 is attached to housing 3 in such situations, using an additional spring 19 that is adjusted to the angle of inclination. This also has the disadvantage that the CD player can be installed in no position in the vehicle other than the predetermined one. That is why some devices include an adapter mechanism which can be used, for example, to adjust a CD changer to the mounting position at hand within certain limits. The known related art is illustrated in FIG. 7a and FIG. 7b. FIG. 7a shows the device with its housing 3, initially mounted in a horizontal position. The CD changer (not illustrated) is attached to a supporting member 2 that is suspended on two discs 40 via two springs 10 and 11 so that supporting member 2 is located more or less in the center of the vibration clearance provided for it. Discs 40 are each attached to the side walls of device housing 3 so that they can rotate around an axis 41. If the device is installed in a horizontal position, springs 10 and 11 are located in position A in FIG. 7b. If the same device is now installed in a vertical position in the motor vehicle, housing 3 is first rotated 90 degrees, and the two discs 40 are rotated 90 degrees in the opposite direction on actuating element 42 until springs 10 and 11 are in position B shown in FIG. 7b and subsequently locked in place. The elastic force of springs 10 and 11 compensates for the weight of supporting member 2, along with the device arranged upon it, so that the supporting member can also vibrate freely in the housing even when mounted in a vertical position. Any intermediate positions between 0 and 90 degrees can also be set. The disadvantage of this related art is that it requires an expensive adapter mechanism, which increases the device production costs. A relatively complicated adjustment of the adapter mechanism to the different mounting positions is also necessary, making it possible to incline the device only around an axis that runs parallel to axes 41.

SUMMARY OF THE INVENTION

The spring arrangement according to the present invention has the advantage that both the spring constants of the individual springs and the natural frequency of the system can be increased. This is achieved by mounting the supporting member in a predetermined position in the housing. A component of elastic force applied in a specific direction is then always counteracted by a component of elastic force in the opposite direction. This prevents the springs from lifting or lowering the supporting member too far away from the center of the preset vibration clearance when using very rigid extension springs or compression springs. At the same time, the supporting member can be installed in different positions in a motor vehicle without having to adjust the spring arrangement or use an adapter mechanism. Another advantage is that the position of the supporting member relative to the housing varies only slightly in different mounting positions, allowing the device to be operated without interference independently of the mounting position when vibrations or shocks occur.

This is essentially achieved by the fact that the springs not only swivel or bend when the housing tilts or rotates, as in the case of the related art illustrated in FIG. 2a, but rather that, with the spring arrangement according to the present invention, the supporting member is mounted in such a way in the housing that the springs are extended when the supporting member is displaced in any direction. As a result, restoring forces always counteract the displacement.

For example, the spring arrangement is advantageously designed so that the supporting member is arranged more or less in the center of the vibration clearance. This prevents the device from bumping against the housing at high oscillation amplitudes.

A further advantage is the use of inexpensive extension springs, the ends of which can be easily attached to the supporting member and housing and then released again, since this reduces the amount of installation work needed, making it cost-effective.

A further advantage is to design the supporting member in the form of a flat, rectangular supporting plate. The rectangular supporting plate can be advantageously mounted in a cuboid housing using springs provided in the corner areas.

A further advantage is provided by mounting the supporting plate in the housing using four extension springs projecting from the plate top and bottom, since this provides stable, elastic mounting of the supporting plate in the center of the vibration clearance and parallel to the upper and lower housing walls.

If the supporting plate is attached to the upper housing wall by two extension springs in two diagonally facing corner areas of its top and to the lower housing wall by two springs projecting from its bottom, four springs are sufficient in order to mount the supporting plate elastically in the housing. This can reduce the production costs.

A particular advantage is provided by mounting the supporting plate in the housing with extension springs projecting at an angle from the plate and facing away from it. This allows the springs to extend even farther, with the resulting restoring forces being even stronger, when the device is mounted in an inclined position.

If the supporting plate is attached to the housing by extension springs that are fastened to the longitudinal sides of the supporting plate and oriented more or less parallel to it, an arrangement with three springs positioned on same plane as the supporting plate is sufficient.

In some situations, e.g., in the case of a CD changer, the vibration-sensitive device is attached to a cuboid supporting member. In such situations, the cuboid supporting member is advantageously suspended between two opposite side walls of the housing using two tapered springs. The first and last coils of the tapered spring do not contribute to spring compliance and are advantageously firmly attached to the side walls in an attachment area lying flat against the side walls. The tapered springs allow the supporting member to be mounted in the housing in a manner that is particularly space-saving and economical.

BRIEF DESCRIPTION OF THE DRAWINGS

FIG. 4b shows a diagram of forces for the embodiment illustrated in FIG. 4a.

FIG. 7b shows a side view of the CD changer show in FIG. 7a.

FIG. 8b shows a side view of the spring arrangement show in FIG. 8a.

DETAILED DESCRIPTION

Figure 3:
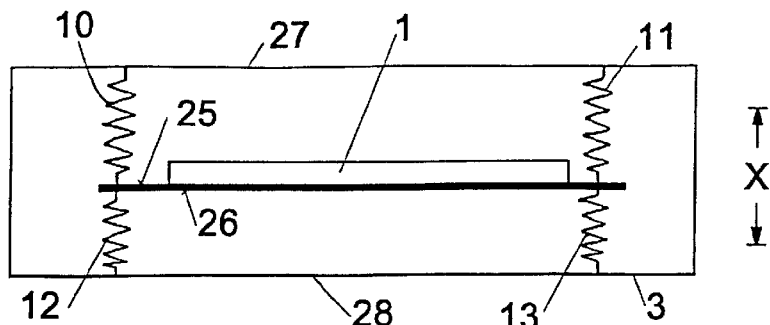
FIG. 3 shows a first exemplary embodiment of the spring arrangement according to the present invention for a compact disc player.

FIG. 3 shows a first embodiment of the spring arrangement according to the present invention. Vibration- or shock-sensitive device 1 in the embodiment illustrated here is a compact disc player. Compact disc player 1 is located on top 25 of a rectangular supporting plate 2. Supporting plate 2 is attached to top 27 of a cuboid housing 3 by four helical spring elements, only two of which are illustrated in FIG. 3, e.g., springs 10 and 11. Housing 3 is, in this case, shown in a horizontal mounting position. Inexpensive extension springs made of wire coiled in a spiral shape, with ends designed in the form of eyes, are used as the helical spring elements. The extension springs allow supporting plate 2 to be easily installed and removed. The extension spring eyes are attached to hooks provided in the corner areas of rectangular supporting plate 2 not covered by CD player 1 and to hooks on housing top 27 opposite the first hooks. Bottom 26 of supporting plate 2 is attached in the same manner to housing bottom 28 via four additional springs, of which only springs 12 and 13 are illustrated in FIG. 3. The length of the extension springs is selected so that all extension springs attached to housing 3 must extend when they are fastened to the hooks positioned on supporting member 2. After all eight springs have been attached, supporting plate 2 is mounted in housing 3. The tensile force of spring 10 applied perpendicular to supporting plate 2 is counteracted by the tensile force of spring 12, the tensile force of spring 11 is counteracted by the tensile force of spring 13, etc. Because the spring constant is chosen so that the force with which springs 10, 11 provided on the plate top pull the supporting plate toward housing top 27 is the same as the force with which opposite springs 12, 13 provided on plate bottom 26 pull supporting plate 2 toward housing bottom 28, the spring constants, and thus the overall rigidity of the oscillatory system, can be increased without displacing the supporting plate from the center of the vibration clearance. This advantageously pushes the natural frequency of the overall system toward higher frequencies. Supporting plate 2 can be connected to housing 3 not only by the spring elements but also by vibration dampers, which are not illustrated in FIG. 3.

Furthermore, the weight of supporting plate 2 and device 1 causes only a slight extension of upper springs 10, 11 and a slight compression of lower springs 12, 13 with a greater spring constant. In the embodiment shown in FIG. 5, therefore, the distance from supporting plate 2 to housing top 27 is slightly greater than the distance to housing bottom 28. By slightly varying the spring length or adjusting the points at which the springs are attached to the housing sections, it is possible to position supporting plate 2 exactly in the center of free vibration excursion x, with the plate oriented horizontally at an equal distance from housing top 27 and housing bottom 28.

Figure 1A:
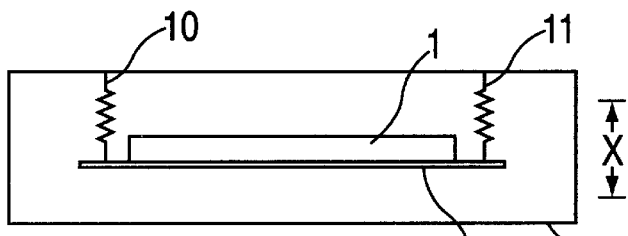
FIG. 1a shows a conventional spring arrangement with a supporting member suspended on extension springs.
Figure 1B:
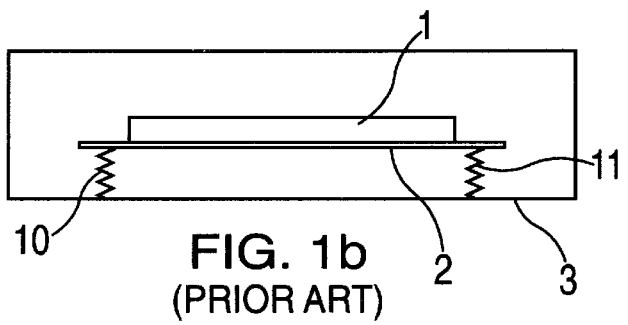
FIG. 1b shows another conventional spring arrangement with the supporting member being mounted on compression springs.
Figure 2A:
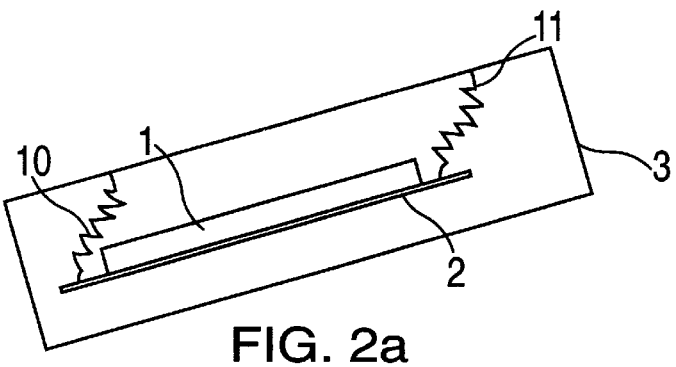
FIG. 2a shows the spring arrangement shown in FIG. 1a in which the device housing is tilted.
Figure 2B:
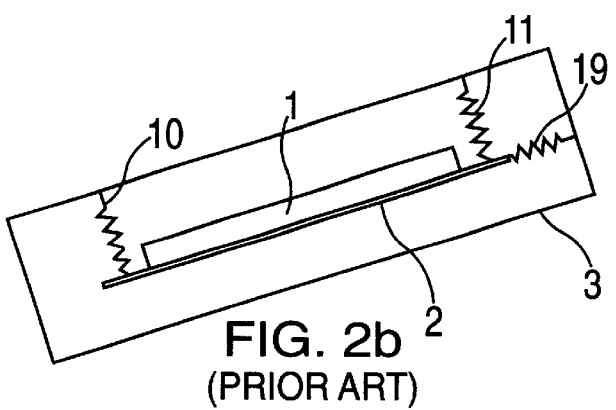
FIG. 2b shows the spring arrangement shown in FIG. 2a with an additional spring adjusted to the tilting angle.

By mounting housing 3 in an inclined position instead of the horizontal position shown in FIG. 3, supporting plate 2 is displaced parallel to housing bottom 28 by one component of its weight. The displacing weight force acts on springs 10, 11, 12, 13 in the form of a radial force. This is the situation illustrated for the related art in FIG. 2a in which springs 10, 11 swivel or bend. In the spring arrangement according to the present invention illustrated in FIG. 3, however, spring 12 prevents spring 10 from merely swiveling, spring 13 prevents spring 11 from merely swiveling, etc. Because supporting member 2 is mounted in the center of the vibration clearance, all eight springs must extend when housing 3 tilts and supporting member 2 is displaced laterally. This extension, in turn, produces a restoring force which counteracts the lateral displacement and increases with the spring constant. The lateral displacement is thus much less pronounced than in the related art. The arrangement also advantageously prevents supporting member 2 from bumping against the side walls of housing 3 under vibrational load or shocks.

Figure 4A:
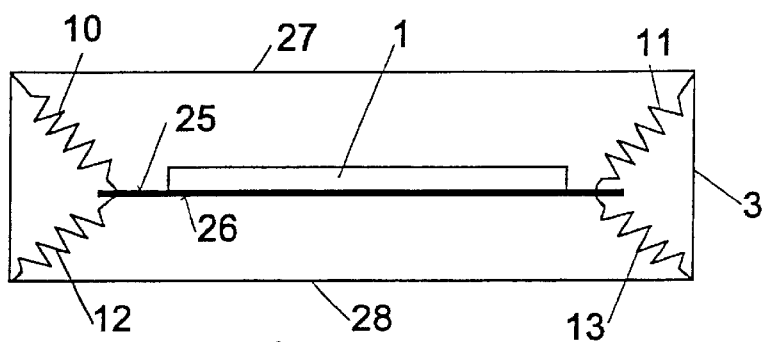
FIG. 4a shows a second exemplary embodiment with springs facing away from the supporting plate at an angle.
Figure 4B:
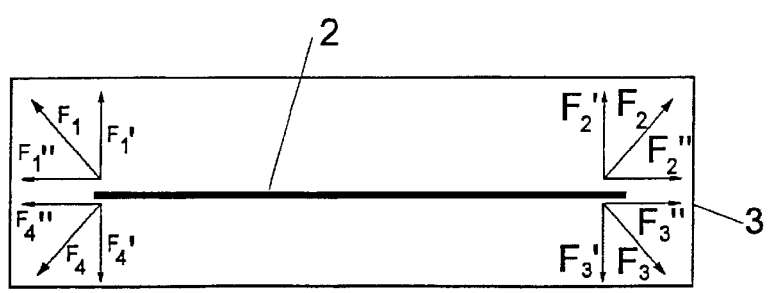

FIG. 4a shows an exemplary embodiment illustrated in FIG. 3. The eight extension springs, of which only four springs 10, 11, 12, 13 facing the observer are shown, project out at an angle from plate top 25 and bottom 26 when device 3 is mounted in a horizontal position. The ends of the extension springs not attached to the corner areas of rectangular supporting plate 2 are fastened to the eight corresponding corners of cuboid housing 3. This is shown somewhat more clearly in the three-dimensional representation of FIG. 5, which, however, illustrates only four springs. It is, of course, also possible to attach the springs to the side walls or fixing elements of a frame instead of directly to the corners of housing 3. Likewise, it is possible to provide fasteners in the housing and to attach some springs to the fasteners and other springs to the housing walls. The important thing is only that the springs are positioned at an angle toward the outside, with the elastic force component of one spring applied in a specific direction being counteracted by an equally strong elastic force component of at least one other spring. FIG. 4b shows a simplified diagram of forces for the embodiment illustrated in FIG. 4a. To make things simple, the representation here is limited to a two-dimensional view. Elastic forces $F_1$, $F_2$, $F_3$, and $F_4$ act upon supporting plate 2. Each of these elastic forces, e.g., elastic force $F_1$, can be broken down into a horizontal component $F_1'$ and a vertical component $F_1''$, which is counteracted by an elastic force component of another spring applied in the opposite direction. For example, component $F_1$ is counteracted by component $F_4'$ of spring 12, and component $F_1''$ is counteracted by component $F_2''$ of spring 11. Because all forces applied compensate for each other, supporting member 2 is positioned in the center of the vibration clearance. The weight of supporting plate 2, which is relatively small compared to the spring forces, merely causes the supporting plate to be slightly displaced in the direction of housing bottom 28. The particular advantage of this embodiment, compared to the example shown in FIG. 3, lies in the fact that the eight springs are pre-tensioned not only in the horizontal direction, but in the vertical direction as well. If housing 3 is mounted at an angle or even vertically, the inclined springs are therefore displaced farther in the axial direction than they are in the example shown in FIG. 3, which results in stronger restoring forces. In the embodiment shown in FIG. 4a, equally strong restoring forces counteract the displacement of supporting member 2 in any direction regardless of the mounting position.

Figure 4C:
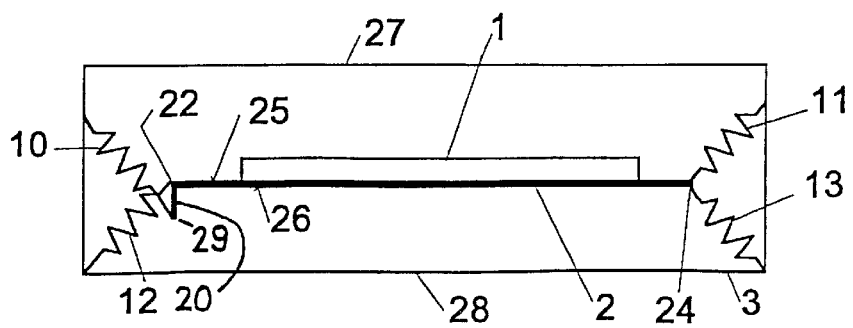
FIG. 4c shows a third embodiment with a leg integrally molded onto the supporting plate.

FIG. 4c shows a further embodiment of the present invention. Supporting member 2 in this case is formed by a rectangular plate 2 with a leg 20 integrally molded onto longitudinal side 22 of the plate and projecting vertically from its bottom 26. Supporting plate 2 is mounted in housing 3 by eight springs, of which only springs 10, 11, 12, and 13 are shown in FIG. 4c. The embodiment differs from the example shown in FIG. 4a by the fact that spring 10 is not attached to top 25 of the supporting plate, but rather to end 29 of leg 20 projecting in the direction of housing bottom 28, and spring 12 is fastened to edge 22 formed by leg 20 and supporting plate 2, so that springs 10 and 11 project above top 25 of supporting member 2, while springs 12 and 13 project in the opposite direction above bottom 26.

Figure 5:
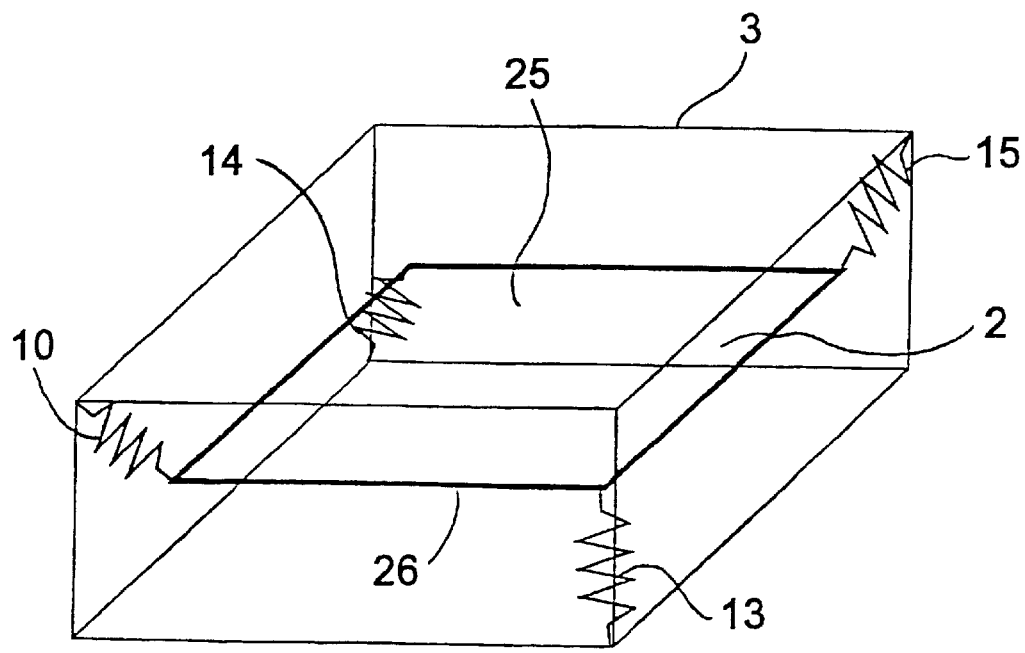
FIG. 5 shoes an exemplary embodiment of the spring arrangement according to the present invention with four springs.

FIG. 5 shows an exemplary embodiment illustrated in FIG. 4a in which supporting member 2 is mounted in housing 3 by only four extension springs 10, 13, 14, 15. Springs 10 and 15 are attached to the supporting plate in two diagonally facing corner areas of supporting plate 2. Springs 10, 15 project outward at an angle from plate top 25 and are attached to housing 3 by their other ends in two corners diagonally facing top 27 of housing 3. The other two corner areas of supporting plate 2 are attached in the same manner to two other diagonally facing corners on bottom 28 of housing 3 via springs 13 and 14. The spring arrangement shown in FIG. 5 is therefore based on the spring arrangement in FIG. 4a described above in that four springs are alternately removed from top 25 and bottom 26. However, since restoring forces counteract any displacement of the supporting plate, regardless of the mounting position, the spring arrangement in FIG. 5 has the advantage that it requires only four springs.

Figure 6:
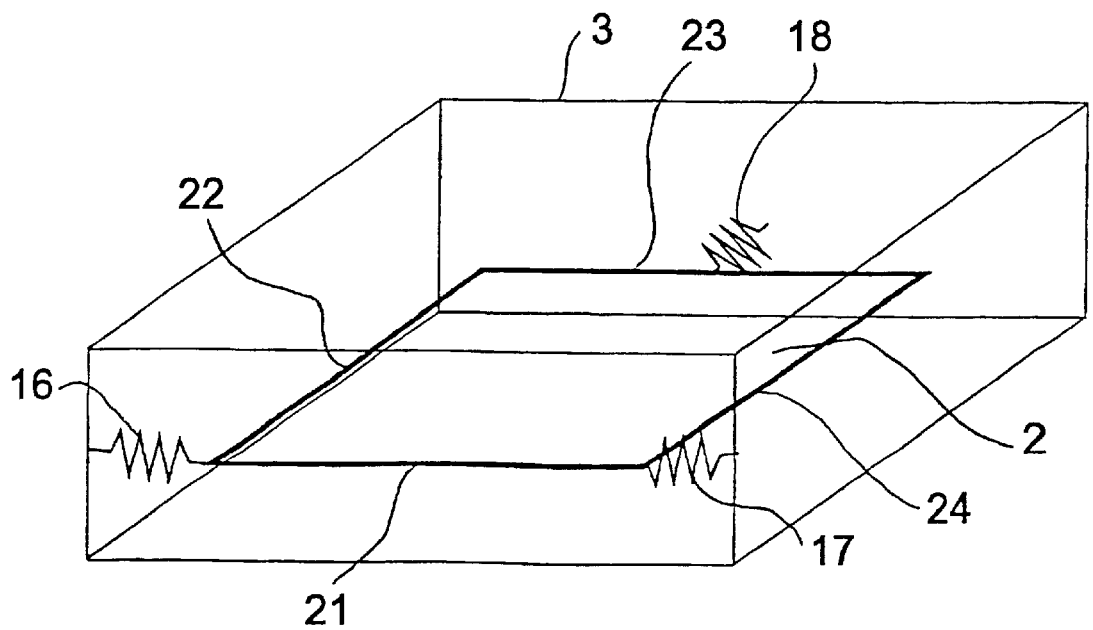
FIG. 6 shows a further embodiment according to the present invention with three springs.

FIG. 6 shows a further embodiment of the present invention which requires only three springs. Supporting member 2 is suspended like a trampoline in the center of cuboid housing 3 and attached to housing 3 by three extension springs 16, 17, 18 arranged on the same plane as supporting plate 2. Extension spring 16 in the corner area formed by longitudinal sides 21 and 24 of the supporting plate is attached to the inner edge of housing 2 opposite this corner area. In the corner area formed by longitudinal sides 21 and 24, extension spring 17 is attached to an adjacent inner edge of housing 3. Third extension spring 18 connects the central portion of longitudinal side 23 opposite springs 16 and 17 to the center of the housing wall located opposite the inner edges connected to springs 16 and 17. In the embodiment shown in FIG. 6, the distance from supporting plate 2 to the side walls of housing 3 must be slightly greater than in the example shown in FIG. 5.

Figure 7A:
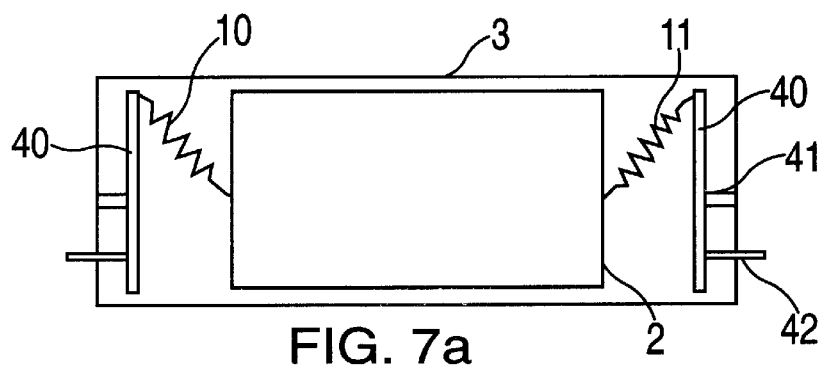
FIG. 7a shows a schematic cross-section of a conventional CD changer suspended on two springs.
Figure 7B:
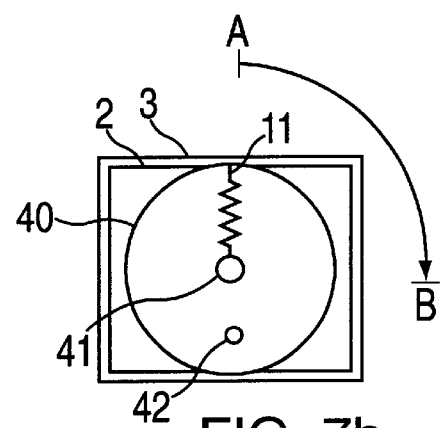
Figure 8A:
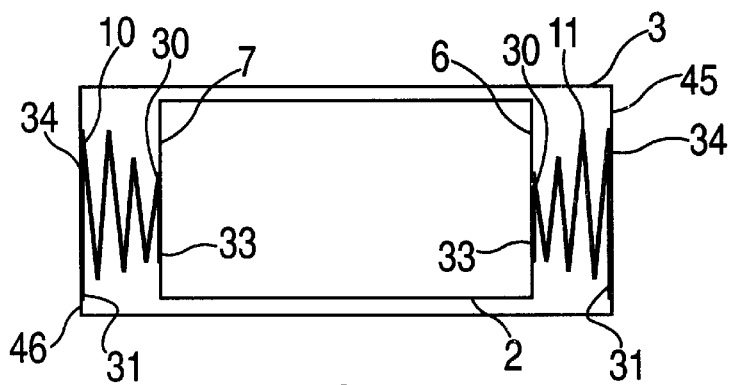
FIG. 8a shows a schematic cross-section of an exemplary embodiment according to the present invention of the spring arrangement for a CD changer.
Figure 8B:
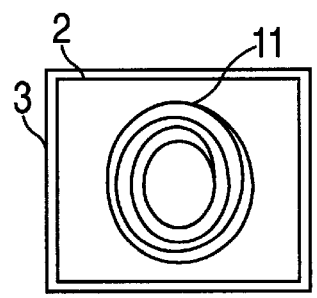

FIG. 8a and FIG. 8b show a further embodiment of the present invention. In this case, the vibration-sensitive device (not illustrated) is a CD changer that is positioned in a cuboid supporting member 2. Supporting member 2 has at least two side walls 6 and 7 that are connected to housing 3 by helical spring elements 10 and 11. Used as helical spring elements 10, 11 are conventional tapered springs whose inner coils fit together in a spiral shape when the spring is fully compressed, so that the height of the spring, in this case, equals the diameter of a single coil. The advantage of tapered springs is that they have a low overall height. Tapered springs can be designed as wire or flat spiral springs. In addition, springs 10 and 11 can be provided as extension or compression springs. In the embodiment shown in FIGS. 4*a–c,* springs 10, 11 are designed as extension springs. The springs have, at their ends, two dummy coils 30 and 31 which do not contribute to spring compliance. End coil 30 of spring 10 is integrally attached to side wall 7 of supporting member 2 in an attachment area 33 lying flat against side wall 7. End coil 31, which has the largest diameter, is integrally attached to opposite side wall 46 of housing 3 in an attachment area 34. Spring 11 is attached in the same manner to side wall 6 of the supporting member and to side wall 45 opposite side wall 46 of housing 3. In an arrangement with only two springs, the attachment method causes restoring forces to counteract peripheral forces which result when supporting member 2 rotates around the axes of springs 10, 11 and produces torsion in springs 10, 11. The tensile force of spring 10 is also counteracted by the tensile force of spring 11 so that supporting member 2 is suspended between tapered springs 10 and 11 approximately in the center of the vibration clearance provided for it. A high enough spring constant of the two springs is selected so that the weight of supporting member 2, along with the CD changer, produces only a very slight vertical displacement of supporting member 2. If housing 3 rotates around an axis that runs through the longitudinal axis of springs 10 and 11, equally strong restoring forces therefore always counteract the weight of supporting member 2, due to the rotational symmetry of the tapered springs. In the case of a rotation around an axis running perpendicularly to the paper plane in FIG. 8*a,* strong restoring forces also counteract the horizontal displacement of supporting member 2, unlike the related art illustrated in FIG. 7*a,* so that supporting member 2 continues to remain more or less in the center of the vibration clearance.

What is claimed is:

1. A spring arrangement apparatus for mounting at least one of a vibration-sensitive device and a shock-sensitive device, the apparatus comprising:

a supporting plate, the supporting plate including a top portion and a bottom portion;

a housing, the housing enclosing the supporting plate; and a spring arrangement, the spring arrangement consisting of:

four helical spring elements including two first extension springs and two second extension springs, the spring elements suspending the supporting plate in the housing to provide a first elastic force component of one of the spring elements and at least one second elastic force component of another one of the spring elements, the first elastic force component being counteracted by the at least one second elastic force component, the first elastic force component being in a first direction, the at least one second elastic force component being in a second direction which is opposite to the first direction, wherein one of the first extension springs is situated in a first area of the supporting plate and another one of the first extension springs is situated in a second area of the supporting plate, the first area being diagonally opposite to the second area, wherein one of the second extension springs is situated in a third area of the supporting plate and another one of the second extension springs is situated in a fourth area of the supporting plate, the third area being diagonally opposite to the fourth area, wherein the first extension springs project from the top portion and are attached to at least one first section of the housing, the second extension springs projecting from the bottom portion and being attached to at least one second section of the housing which is situated opposite to the at least one first section, and wherein the spring elements maintain the supporting plate at a first distance from the at least one first section and at a second distance from the at least one second section, the first distance being substantially equal to the second distance;

wherein the at least one of a vibration-sensitive device and a shock-sensitive device is enclosed within the housing when mounted on the supporting plate.

2. The spring arrangement apparatus according to claim 1, wherein the supporting plate is situated approximately in a center of a vibration clearance, the vibration clearance being provided for the supporting plate.

3. The spring arrangement apparatus according to claim 1, wherein the supporting plate is attached to the housing via the spring elements, the spring elements projecting at an angle from the supporting plate and facing away from the supporting plate.

4. The spring arrangement apparatus according to claim 1, wherein:

the supporting plate is rectangular, the supporting plate having a first corner, a second corner, a third corner and a fourth corner;

the first area corresponds to the first corner, the second area corresponds to the second corner, the third area corresponds to the third corner, and the fourth area corresponds to the fourth corner; and the first corner is diagonally opposite from the second corner and the third corner is diagonally opposite from the fourth corner.

5. The spring arrangement apparatus according to claim 1, wherein the first area, the second area, the third area, and the fourth area define a supporting plate plane.

6. The spring arrangement apparatus according to claim 5, wherein the first extension springs extend from a top of the supporting plate plane and the second extension springs extend from a bottom of the supporting plate plane.

7. The spring arrangement apparatus according to claim 5, wherein:

a first two attachment points on the housing for the first extension springs lie within a first housing plane; and a second two attachment points on the housing for the second extension springs lie within a second housing plane, wherein the first housing plane is different from the second housing plane.

8. A spring arrangement apparatus for mounting at least one of a vibration-sensitive device and a shock-sensitive device, the apparatus comprising:

a supporting member, the supporting member including a top portion and a bottom portion;

a housing, the housing enclosing the supporting member; and a spring arrangement, the spring arrangement comprising:

helical spring elements including at least two tapered springs, the spring elements suspending the supporting member in the housing to provide a first elastic force component of one of the spring elements and at least one second elastic force component of another one of the spring elements, the first elastic force component being counteracted by the at least one second elastic force component, the first elastic force component being in a first direction, the at least one second elastic force component being in a second direction which is opposite to the first direction, wherein a first tapered spring of the least two tapered springs acts in a third direction, a second tapered spring of the at least two tapered springs acting in a fourth direction which is opposite to the third direction, wherein a first end of each of the spring elements is attached to a first side wall of the supporting member, a second end of each of the spring elements being attached to a second side wall of the housing, and wherein end coils of the at least two tapered springs include dummy coils which do not contribute to a spring compliance, a first end coil of the end coils being connected to the first side wall and a second end coil of the end coils being connected to the second side wall in lying-flat attachment areas.

* * * * *